United States Patent [19]

Miller

[11] Patent Number: 4,570,347
[45] Date of Patent: Feb. 18, 1986

[54] SEALING ARRANGEMENT FOR INCAPSULATED MEASURING INSTRUMENT

[75] Inventor: Walter Miller, Traunstein, Fed. Rep. of Germany

[73] Assignee: Dr. Johannes Heidenhain GmbH, Traunreut, Fed. Rep. of Germany

[21] Appl. No.: 688,607

[22] Filed: Jan. 3, 1985

[30] Foreign Application Priority Data

Jan. 7, 1984 [DE] Fed. Rep. of Germany ....... 3400395

[51] Int. Cl.⁴ .................... G01B 11/04; F16J 15/40
[52] U.S. Cl. .................... 33/125 R; 277/DIG. 7; 277/135
[58] Field of Search .................. 33/125 R, 137 R; 277/12, 32, DIG. 7, 226, DIG. 4; 92/88; 244/63

[56] References Cited

U.S. PATENT DOCUMENTS

| | | | |
|---|---|---|---|
| 3,791,037 | 2/1974 | Diciaccio et al. | 277/DIG. 7 |
| 4,057,258 | 11/1977 | Ernst et al. | 277/DIG. 7 |
| 4,094,172 | 6/1978 | Arendt | 277/DIG. 7 X |
| 4,170,829 | 10/1979 | Nelle | 33/125 R |
| 4,376,543 | 3/1983 | Sakagami | 277/DIG. 7 X |

FOREIGN PATENT DOCUMENTS

| | | |
|---|---|---|
| 2746718 | 4/1979 | Fed. Rep. of Germany ... 277/DIG. 7 |
| 2846768 | 4/1980 | Fed. Rep. of Germany . |
| 3124151 | 9/1982 | Fed. Rep. of Germany . |
| 3215334 | 6/1983 | Fed. Rep. of Germany . |
| 953343 | 4/1964 | United Kingdom ............. 33/125 R |
| 1049947 | 11/1966 | United Kingdom ......... 277/DIG. 7 |

Primary Examiner—Robert S. Ward
Attorney, Agent, or Firm—Willian, Brinks, Olds, Hofer, Gilson & Lione Ltd.

[57] ABSTRACT

A device for sealing a slit in the housing of an encapsulated instrument through which passes a follower for mechanically connecting an object to be measured with the measuring instrument. The slit in the instrument housing is sealed by a slotted tube, with overlapping flanks, running the length of the slit. An enlargement on the follower in the form of an ellipsoid clings to the interior of the tube walls and extends beyond the opening in the tube created by the passage of the follower, thereby maintaining a seal.

9 Claims, 7 Drawing Figures

SEALING ARRANGEMENT FOR INCAPSULATED MEASURING INSTRUMENT

BACKGROUND OF THE INVENTION

The present invention relates to a device for sealing the slit in the housing of an encapsulated length or angle measuring instrument, through which passes a follower for mechanically connecting an object to be measured with a measuring component lcoated within the housing of the instrument.

Encapsulated length or angle measuring instruments are used to measure the relative position of two moveable objects. The housing is attached to the first object and a follower passes through a slit in the housing and connects the second object with a component of the measuring instrument. Typically the component is a scanning device which is caused by the follower to move along a measuring scale which is mounted to the instrument housing. Such encapsulated instruments are often used on machine tools to measure the relative position of the slide unit with respect to the machine bed.

Since these instruments are often used in environments subject to contamination from dust, oil, metal chips and the like, it is necessary to protect the highly sensitive measuring scale and scanning unit. For this reason the slit in the housing is often closed and sealed as well as possible. A measuring instrument of the type described above is disclosed in German Pat. No. 28 46 768 wherein the slit in the housing is closed by means of plastic or rubber sealing lips formed in a roof shape.

For this type of sealing mechanism to provide hermetic shielding of the housing, the sealing lips are typically made to lie close to the follower and are typically constructed of elastic material with a high restoring force. Problems with this type of sealing mechanism may arise because the high restoring force of the elastic material causes friction between the follower and the elastic material. The follower, subject to these frictional forces, may thereby be caused to undergo deformations in the measuring direction that are detrimental to the measuring accuracy of the instrument. Further problems with this type of sealing mechanism may arise with the seal at the fore and aft sections of the follower. Openings between the sealing elements often occur at these areas because of the torque, in the longitudinal direction, applied to the sealing lips by the passage of the follower through the lips. Although these openings may be reduced by constructing the follower with a sword-shaped cross-section, they nevertheless tend to expose the measuring instrument to possible contamination.

SUMMARY OF THE INVENTION

This invention is directed to a device for sealing the slit in the housing of an encapsulated measuring instrument through which passes a follower for connecting the measuring component of the instrument with the object to be measured.

According to this invention, flexible sealing means are provided in a measuring instrument of the type initially described above for covering the slit around the follower. This sealing means comprises first and second flanks which are positioned to overlap one another and thereby to seal the slit. At least one enlargement is located on the follower within a region sealed by the sealing means. This enlargement extends beyond the cross-sectional dimension of the follower in the region where the follower passes between the flanks, and the enlargement cooperates with the flanks to seal the opening between the first and second flanks caused by the passage of the follower between the flanks.

A particular advantage of the preferred embodiments described below is the particularly effective sealing they provide. Furthermore, the exposed sealing elements may be formed of highly resistant materials well adapted to protect the measuring instrument against shavings, chips or even liquid coolants.

A further advantage of the preferred embodiments is that flexible sealing materials with low restoring forces can be selected so that the frictional forces against the follower are reduced. Therefore, the measuring accuracy of the instrument is less likely to be degraded by the sealing mechanism.

The invention itself, together with further objects and attendant advantages, will best be understood by reference to the following detailed description, taken in conjunction with the accompanying drawings.

DETAILED DESCRIPTION OF THE PREFERRED EMBODIMENTS

Figure 1:
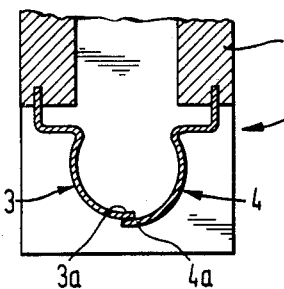
FIG. 1 is a cross-sectional view of a measuring instrument which incorporates a first preferred embodiment of this invention, in which the sealing elements are shown in a closed position.

Turning now to the drawings, FIG. 1 shows a cross-sectional view of a measuring instrument 1 which includes a pair of sealing elements 3, 4. This measuring instrument 1 is of the type which includes a measuring scale mounted to a housing 2, and a scanning unit mounted to move along the scale within the housing 2. In FIG. 1 the sealing elements 3, 4, are shown in the closed position. The sealing elements 3, 4 are constructed as a slotted tube, with the flanks 3a, 4a overlapping in the slit zone. The overlapping flanks 3a, 4a provide a seal, preventing harmful environmental influences from affecting the measuring components interior to the housing 2. Hence, the measuring instrument 1 is completely encapsulated.

Figure 2:
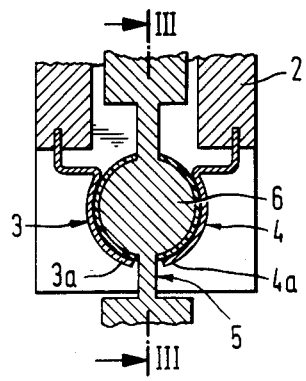
FIG. 2 is a cross-sectional view of the embodiment in FIG. 1 showing the sealing elements opened by the passage of a follower.
Figure 4:
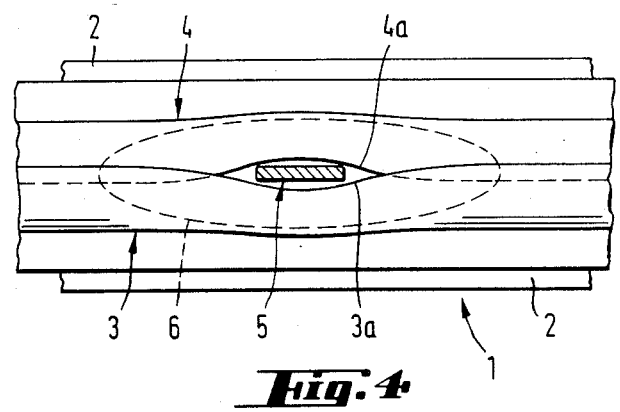
FIG. 4 is an bottom view of the embodiment of FIG. 1.

In FIG. 2, the above described measuring instrument 1 is cross-sectionally represented at a position where a follower 5 passes through the sealing elements 3, 4 and causes the sealing elements 3, 4 to spread open. The follower 5 couples the scanning unit within the housing unit 2 to an object, the position of which is to be measured. The resulting gaps, fore and aft of the follower 5, are sealed by an ellipsoid 6 of revolution which is positioned on the follower 5 directly against the inner walls of the sealing elements 3, 4. The openings between the sealing elements 3, 4 caused by the passage of the follower 5 are best shown in FIG. 4. The ellipsoid 6 of revolution is shaped to cling to the inner walls of the opened sealing elements 3, 4 and to extend far enough behind and in front of the follower 5 to seal all openings into the housing 2.

Figure 3:
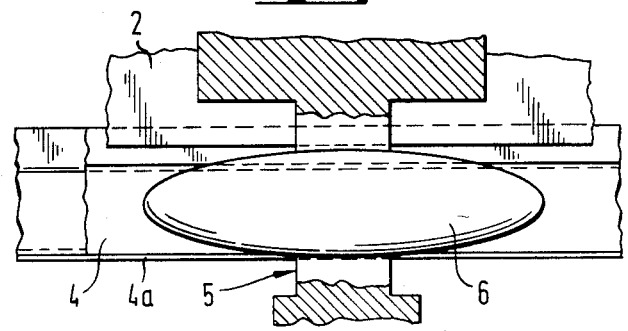
FIG. 3 is a longitudinal cross-sectional view of the embodiment of FIG. 1.

A longitudinal cross-sectional view of the first preferred embodiment of FIG. 1 is shown in FIG. 3. The shape of the ellipsoid 6 of revolution relative to the opening between the sealing elements 3, 4 is illustrated in the underview of FIG. 4.

Figure 5:
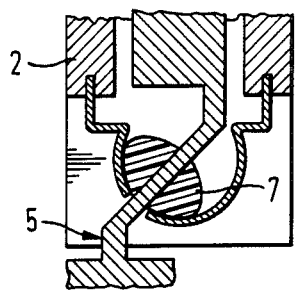
FIG. 5 is a cross-sectional view of a measuring instrument which incorporates a second preferred embodiment.

A second embodiment of the present invention is shown in FIG. 5, wherein the follower 5 defines a general ellipsoid 7, with the advantage of having less mass than the ellipsoid 6 of revolution. The sealing capabilities of the ellipsoid 7 are analogous to those of the ellipsoid 6 of revolution described above and shown in FIG. 2 through FIG. 4.

Figure 6:
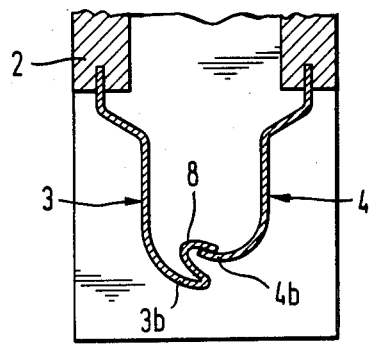
FIG. 6 is a cross-sectional view of a measuring instrument which incorporates a third preferred embodiment.

A third embodiment, shown in FIG. 6, presents a modification of the sealing elements 3, 4. In this embodiment, the flank 3b of the tube is shaped to form a pocket 8 for engagement with a second flank 4b. This arrangement of the sealing elements 3, 4 provides an overlapping seal as in the first embodiment above, but with the added advantage that the flank 4b is surrounded, thereby creating a broader sealing surface.

Figure 7:
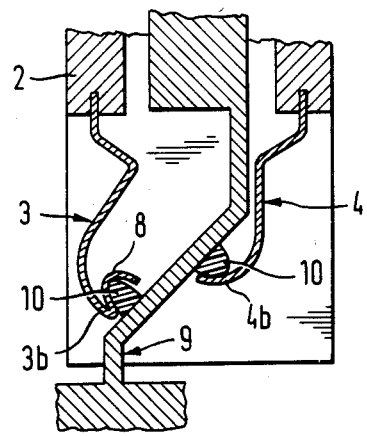
FIG. 7 is a cross-sectional view of the embodiment of FIG. 6 showing the sealing elements opened by the passage of the follower.

As shown in FIG. 7, the follower 9 of the third embodiment comprises enlargements 10, functionally similar to those previously discussed. The enlargements 10 are shaped to engage and seal with the pocket 8 of the flank 3b and to seal with the opposing flank 4b.

The selection of materials for the components of the present invention should be based on the environment in which the measuring instrument is to be operated in order to provide good sealing properties with acceptable low friction. To seal extremely small gaps, a sealing fluid such as oil may be used on the interior of the sealing elements 3, 4. Such oil can be provided by the lubricant circulation system of the machine on which the measuring instrument is mounted. Alternatively, a gas may be used to pressurize the interior of the housing 2 so that contaminants are blown out or prevented from entering the housing 2.

Of course, it should be understood that a wide range of changes and modifications can be made to the preferred embodiments described above. It is therefore intended that the foregoing detailed description be regarded as illustrative rather than limiting, and that it be understood that it is the following claims, including all equivalents, which are intended to define the scope of this invention.

I claim:

1. In an encapsulated measuring instrument for measuring the position of first and second objects movable relative to each other, of the type having a housing connected to said first object, said housing having at least one slit running in the direction of movement of said second object, and a follower passing through said slit connecting said second object with said measuring instrument, the improvment comprising:
   at least one enlargement smoothly curved in three dimensions, said enlargement comprising two tapered ends along an axis defined by said slit, said enlargement located on said follower, said enlargement extending beyond the cross-sectional dimension of said follower in the region where said follower passes through said slit; and
   flexible sealing means for covering said slit around said follower and capable of producing resilient forces, said sealing means comprising first and second flanks, each of said first and second flanks comprising an inner concave surface shaped to conform to and contact with resilient force said enlargement, said first flank positioned to overlap said second flank and cooperate with said second flank to seal said slit with said resilient force when not separated by said follower;
   said tapered ends cooperating with said inner concave surface of said first and second flanks to gradually spread said flanks apart and to allow said flanks to gradually resume said overlap position in the area of passage of said follower while said resilient force of said flanks against said enlargement maintains the seal of said slit 2. The invention of claim 1 wherein said first flank defines a pocket extending along the slit and shaped to receive and seal against said second flank.

3. The invention of claim 1 wherein said enlargement is shaped to define an ellipsoid of revolution.

4. The invention of claim 1 wherein said enlargement is shaped to define an ellipsoid.

5. The invention of claim 1 wherein said sealing means comprises a metal slotted tube.

6. The invention of claim 1 further comprising means for providing a compressed gas within the housing.

7. The invention of claim 1 further comprising means for providing a sealing fluid within the housing.

8. The invention of claim 1 wherein the enlargement comprises a low friction synthetic material.

9. In an encapsulated measuring instrument for measuring the position of first and second objects movable relative to each other, of the type having a housing connected to said first object, said housing having at least one slit running in the direction of movement of said second object, and a follower passing through said slit connecting said second object with said measuring instrument, the improvement comprising:
   at least one enlargement comprising an ellipsoid of revolution which defines an axis of revolution oriented parallel to said slit, said ellipsoid comprising two tapered ends, said ellipsoid located on said follower and extending beyond the cross-sectional dimension of said follower in the region where the follower passes through said slit; and
   flexible sealing means comprising a slotted tube of cylindrical cross-section for covering said slit around said follower and capable of producing resilient forces, said sealing means comprising first and second flanks, each of said first and second flanks comprising an inner concave surface shaped to conform to and substantially contact with resilient force said ellipsoid, said first flank positioned to overlap said second flank and to seal said slit with resilient force when not separated by said follower;
   said ellipsoid operative during movement of said follower along said slit to obliquely contact said inner concave surface of said first and second flanks so as to gradually force the flanks radially outward in front of said follower and to allow said flanks to gradually close radially inward behind said follower while maintaining the slit seal through contact between said ellipsoid and said flanks under said resilient force.

* * * * *